(12) United States Patent
Singh et al.

(10) Patent No.: US 6,451,362 B1
(45) Date of Patent: Sep. 17, 2002

(54) PHYTOGLYCOGEN COATED FOOD AND PROCESS OF PREPARING

(75) Inventors: R. Paul Singh; Clara O. Rovedo, both of Davis, CA (US); José A. Cura, Buenos Aires (AR)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/240,162

(22) Filed: Jan. 29, 1999

(51) Int. Cl.[7] .......................... A23B 7/16; A23L 1/164; A23L 1/217
(52) U.S. Cl. .......................... 426/93; 426/96; 426/102; 426/302; 426/619; 426/620; 426/621
(58) Field of Search .................... 426/94, 658, 459, 426/460, 463, 469, 619, 102, 555, 93, 96, 302, 620, 621

(56) References Cited

U.S. PATENT DOCUMENTS

| | | | |
|---|---|---|---|
| 3,769,438 A | | 10/1973 | Rusch et al. .................... 426/79 |
| 5,093,146 A | * | 3/1992 | Calanfro ....................... 426/619 |
| 5,476,674 A | | 12/1995 | Friedman et al. ............. 426/552 |
| 5,648,110 A | * | 7/1997 | Wu et al. ..................... 426/102 |
| 5,709,902 A | | 1/1998 | Bartolomei et al. .......... 426/620 |
| 5,895,686 A | * | 4/1999 | Horino et al. ............... 426/658 |
| 5,912,413 A | * | 6/1999 | Myers et al. ................. 800/205 |

OTHER PUBLICATIONS

James et al., "Characterization of Maize Gen Sugary–1, a Deterimant of Starch Compostion in Kernel", Plant Cell, 7 (4), pp. 417–429.*
Curá and Krisman, "Cereal Grains: A Study of their α–1, 4–α–1,6 Glucopolysaccharide Composition," *Starch/Stärke*, 42(5), pp. 171–175 (1990).
Curá and Krisman, "Maize Mutants. Part: Studies on their Starch Components," *Starch/Stärke*, 47(6), pp. 210–213 (1995).
James et al., "Characterization of Maize Gene Sugary–1, a Determinant of Starch Composition in Kernel," *Plant Cell*, 7(4), pp. 417–429 (1995).
Nakamura et al., "Correlation Between Activities of Starch Debranching Enzyme and α–Polyglucan Structure in Endosperms of Sugary–1 Mutants of Rice," *Plant Journal*, 12(1), pp. 143–153 (1997).

* cited by examiner

*Primary Examiner*—Arthur L. Corbin
(74) *Attorney, Agent, or Firm*—Knobbe, Martens, Olson & Bear, LLP

(57) ABSTRACT

Phytoglycogen coatings on Ready-to-Eat cereals provide extended bowl life. When added to food surfaces prior to frying, phytoglycogen decreases loss of crispness during post-frying storage, and also improves the appearance and flavor of the fried product.

15 Claims, 1 Drawing Sheet

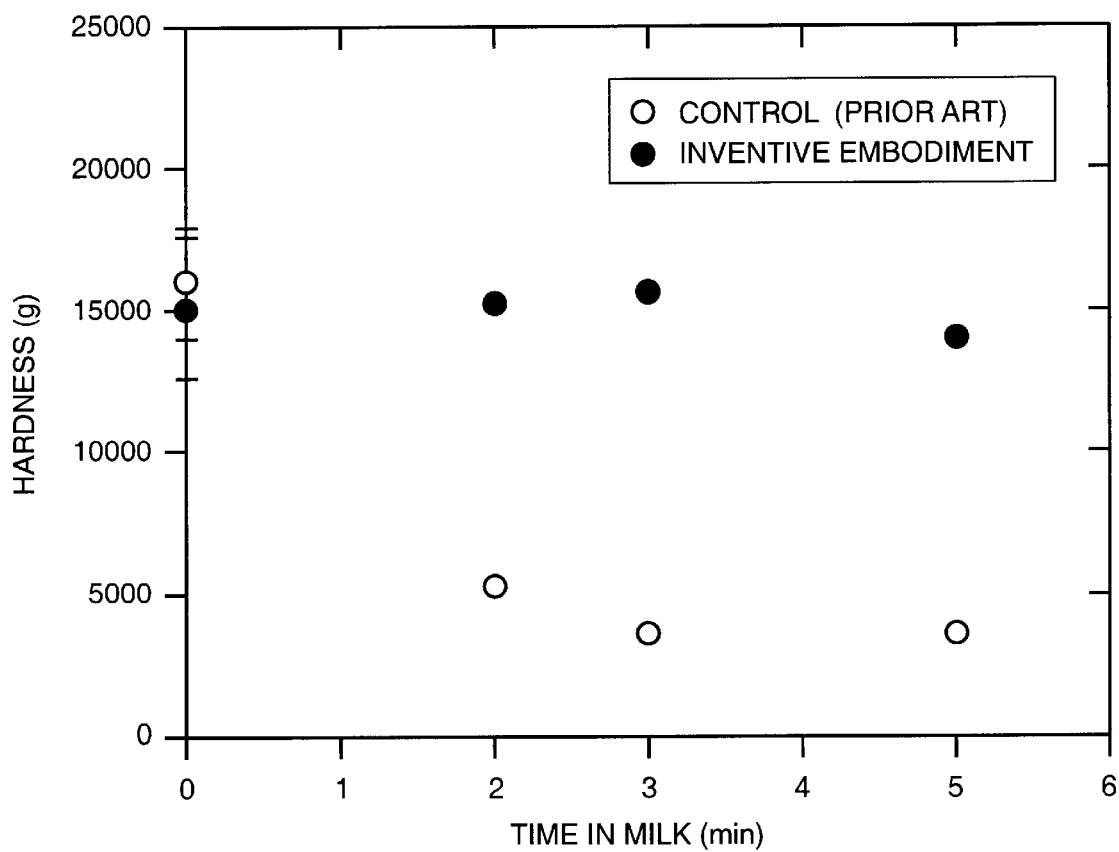
FIG._1

PHYTOGLYCOGEN COATED FOOD AND PROCESS OF PREPARING

FIELD OF THE INVENTION

The present invention generally relates to food products and to methods for their preparation, and more particularly to the use of phytoglycogen as an additive or processing aid for foods, such as to provide an extended bowl life for ready-to-eat cereals when phytoglycogen coatings are applied to the food surfaces and to maintain crispness of fried foods after frying.

This invention was made with Government support under Grant No. 94-37500-0554, awarded by the U.S. Department of Agriculture. The Government has certain rights in this invention.

BACKGROUND OF THE INVENTION

Phytoglycogen is a polysaccharide that constitutes a reserve for plants. It is the main component extracted in the water soluble, polysaccharide fraction in sweet corn and consists of glucose molecules linked by α-D-(1→4) bonds with α-D-(1→6) branch points. Shannon and Garwood, *Genetics and Physiology of Starch Development,* (2d edition, 1984). The accumulation of water soluble polysaccharide gives a creamy texture to prepared sweet corn products Maize endosperm mutants can be identified by their polysaccharide structure and content (amylose, amylopectin, and phytoglycogen) with up to 30 wt. % phytoglycogen of kernel dry weight found in some sugary corn mutant kernels. "Maize Mutants. Part 1. Studies on Their Starch Components," Curá et al., *Starke,* 47(6), pp. 210–213 (1995); "Cereal Grains: A Study of Their α-1,4-α1,6 Glycopolysaccharide Composition," Curá et al., *Starke,* 42(5), pp. 171–175 (1990).

Ready-to-eat ("R-T-E") cereals are popular food items as breakfast foods and as snack foods. They are increasingly functioning as important nutritional supplements in American's diets (according to a recent report published in *Health News,* a newsletter from the publishers of the *New England Journal of Medicine*). Most R-T-E cereals may be grouped into puffed or unpuffed cereal categories.

Generally, expanded or puffed cereals have little or no added fat, are not chemically leavened, and have a low density. They are very porous due to the cell structure formed by flashing off moisture at the extruder die. The porous characteristics of puffed cereals result in a cereal that can quickly become soggy in milk. U.S. Pat. No. 5,093,146, issued Mar. 3, 1992, inventors Calandro et al. (assignee Nabisco Brands, Inc.) discusses methods of extending cereal bowl life, such as by providing a heavy sugar coating. This patent describes using a mixture of pregelatanized waxy starch or modified waxy starch and at least one cold water swelling granule starch for coating a cookie dough intended for preparing a crispy, R-T-E cereal.

Unpuffed cereal types include flake, shreds, biscuits, shredded biscuits, and granola cereals. The preparations of these unpuffed cereal types typically include a toasting operation, as is described by U.S. Pat. No. 5,709,902, issued Jan. 20, 1998, inventors Bartolomei et al. (assignee General Mills, Inc.). This patent describes use of a high moisture sugar slurry for application to cereal flakes to provide a R-T-E cereal that exhibits greater crispness and extended bowl life.

Although it is known that sugar coated R-T-E cereals have generally longer bowl lives than regular R-T-E cereals, a heavy sugar coating on cereal is not necessarily desirable, particularly if the consumer does not wish to ingest substantial amounts of sugar with her cereal. However, the rheology of finished cereals is quite important for consumer acceptance. In general, the textural quality of an R-T-E cereal is greatly influenced, as judged by consumers and manufacturers, on initial crispness and ability to retain that crispness after immersion into milk.

Therefore, new methods for improving texture characteristics of food stuffs, particularly a characteristic such as cereal bowl life, remain desirable.

Meanwhile, plant breeding efforts have led to corn varieties with increased sweetness. The components of these corns have been objects of careful study, particularly since the rapid conversion of sugars to phytoglycogen after harvest and the resultant loss of sweetness is a major problem affecting quality. For example, the components of the sugary-1 (SU1) mutation in rice and corn have been examined. For rice, phytoglycogen was found to be present in the endosperm of all the mutants instead of starch. "Correlation Between Activities of Starch Debranching Enzyme and α-Polyglucan Structure in Endosperms of Sugary-1 Mutants of Rice," Nakamura et al., *Plant Journal,* 12(1), pp. 143–153 (1997); For the corn mutants, there was found to be an increased sucrose concentration, a decreased concentration of starch (amylopectin) and an accumulation of the highly branched gluco-polysaccharide phytoglycogen. "Characterization of the Maize Gene Sugary-1, a Determinant of Starch Composition in Kernel," James et al., *Plant Cell,* 7(4), pp. 417–429 (1995).

To date, since consumers seem to prefer increased corn sweetness, and the rapid conversion of sugars to phytoglycogen after harvest results in loss of sweetness, increases in phytoglycogen in cereal based products such as those from corn would seem to be desirably avoided.

SUMMARY OF THE INVENTION

We have surprisingly discovered that phytoglycogen is a useful processing aid, or additive, for food products, such as by applying onto food surfaces, or by admixing phytoglycogen with foods that will be further processed. Phytoglycogen as a processing aid provides several advantageous properties to the foods: when applied as a coating on a food prior to frying, the fried food retains its crispiness for significantly longer than control samples; when a coating of phytoglycogen is applied to surfaces of many R-T-E cereals followed by drying, the so-coated cereal retains a crispy texture for an extended time when kept submerged in milk.

Accordingly, in one aspect of the present invention, a method of preparing a R-T-E cereal having an extended bowl life, comprises applying phytoglycogen to surfaces of the R-T-E cereal.

In another aspect of the present invention a food comprises a processing aid incorporated onto or in the food. The processing aid includes phytoglycogen. If the food to which the processing aid naturally includes phytoglycogen, then the phytoglycogen that is added in accordance with the invention increases the total amount of phytoglycogen, wherein the amount of phytoglycogen added is effective to increase resistance to wetting by a liquid with which the food is expected to be exposed.

Other aspects and advantages of the present invention will become apparent upon reading the specification and claims.

BRIEF DESCRIPTION OF THE DRAWINGS

FIG. 1 graphically presents tests on samples conducted using a Kramer Sheer probe with a control (prior art)

commercially available corn based R-T-E cereal and an inventive R-T-E cereal embodiment. The samples were tested before exposure to milk, and then at different times after immersion in milk at 8° C. (two, three, and five minutes).

DETAILED DESCRIPTION OF THE PREFERRED EMBODIMENTS

Broadly, this invention provides uses of phytoglycogen as an additive or processing aid for foods. For example, coatings of phytoglycogen on the outer surfaces of foods are here shown to give greater crispness and extended bowl life to foods, and to improve the appearance and flavor of a product that was further processed (such as by frying).

With reference to FIG. 1, a commercially available R-T-E cereal (KELLOGG'S CORN FLAKES) was modified in accordance with the invention, as will be more fully described by Example 5. As is demonstrated by the FIG. 1 data, the texture retention of the inventive embodiment cereal was noticeably improved so that even after five minutes immersion in milk, the texture retention was substantially the same as that before exposure to milk. That is, the inventive embodiment cereal for which data is shown by FIG. 1 has a significantly extended bowl life. By contrast, after two minutes exposure to milk the control (commercially available) cereal had lost about two-thirds of its initial texture retention.

Since phytoglycogen is a polysaccharide that constitutes a reserve for plants, it is present in naturally occurring amounts with, for example, up to 30 wt. % of kernel dry weight being phytoglycogen in some sugary corn mutant kernels. However, in practicing the invention, the phytoglycogen being used is as an additive. It will thus be in an amount increased with respect to any phytoglycogen that is naturally present in the food is being modified in accordance with this invention.

With reference again to the FIG. 1 data, the commercially available, control R-T-E cereal was treated in accordance with the invention by spraying a solution of phytoglycogen (1 g phytoglycogen powder/10 ml distilled water, or 10 wt. % phytoglycogen) on both sides of the cereal flakes and then drying. By this treatment in accordance with the invention, the initial crispness of the cereal was substantially maintained for five minutes immersion in milk at 8° C.

A great variety of foods with which phytoglycogen can be used as an additive or processing aid are possible, but particularly preferred embodiments are foods having a cereal base or a cereal component.

Suitable cereal bases may be derived from any cereal grain or mixture thereof. Exemplary are wheat flour, corn flour, oat flour, barley flour, rye flour, rice flour, and mixtures thereof The flours may be bleached or unbleached. The cereal base is generally used in the amount of about 30% by weight to about 50% by weight of the food.

In addition to a cereal base, optional bulking agents may be included to provide added fiber, and/or reduce the caloric value of finished cereal products. The bulking agent may be used as a replacement for all or a portion of flour. Bulking agents which may be used include, for example, polydextrose, hollocellulose, microcrystalline cellulose, and mixtures thereof. Generally, when a bulking agent is used, the bulking agent is blended with a flour in amounts of up to about 20% by weight based upon the weight of the dough. Corn bran, wheat bran, oat bran, rice bran, and mixtures thereof may be used to replace the flour in whole or in part to produce a fiber-enriched product, to enhance color, or to affect texture.

Many cereal based products in accordance with this invention will further include a fat or shortening component, particularly if they are an unpuffed R-T-E cereal. The fat or shortening which may be used in the present invention may be any food grade fat or shortening suitable for baking applications. The fats which may be used generally include vegetable fats, lard, tallow and mixtures thereof. The fat may be fractionated, partially hydrogenated, and/or esterified. Edible reduced- or low-calorie, or non-digestible fats, fat substitutes, or synthetic fats, such as sucrose polyesters which are process compatible, may also be used. The shortenings or fats may be solid or semi-solid at room temperature of about 75° F. to about 90° F. The use of fats which are solid or semi-solid at room temperature is generally preferred over liquid oils to reduce oil separation from the finished product during storage. The fat or shortening component is generally included in amounts of about 5% to about 25% by weight, based on the total weight of the ingredients.

Ready-to-Eat cereals in accordance with the present invention may also contain process-compatible ingredients to modify the texture of the products and to add sweetness and flavor, such as sucrose, fructose, lactose, dextrose, galactose, maltodextrins, corn syrup solids, hydrogenated starch hydrolysates, protein hydrolysates and mixtures thereof. Reducing sugars, such as fructose, maltose, lactose, and dextrose or mixtures of reducing sugars may be used to promote browning during the baking stage. Emulsifiers which can be used include lecithin, sorbitan monostearate, mono- and/or di-glycerides and polyoxyethylene sorbitan fatty acid esters, such as polysorbates (e.g., polyoxyethylene (20) sorbitan monostearate).

Cereal formulations may further contain flavorings such as powdered cocoa, chocolate liquor, vanilla extracts, almond extract, fruit flavors, spices such as cinnamon and nutmeg, and other flavoring agents. Heat tolerant high potency sweeteners can also be used (e.g., acetylsulfame K). However, heat sensitive high potency sweeteners (e.g., aspartame) should not be used exclusively since the rigorous high temperatures of the subsequent drying step can cause degradation of these expensive high potency sweeteners. The amount of flavoring added is determined by the intensity of the flavoring agent and the desired intensity of the flavor. Yet further additional typical components include vitamins. The vitamins selected should preferably be heat tolerant. A particularly useful combination of vitamins for topical application consists of vitamins C, A and D and mixtures thereof In the conventional preparation of a R-T-E cereal, a dry blend of starchy cereal ingredients with or without a bran or fiber constituent is well mixed and then combined with water and minor amounts of other conventional R-T-E cereal ingredients such as salt(s), sugar(s), malt or other flavors and starches. Mixing with heat cooks or gelatinizes the starchy component of the cereal composition such as in a cooker. The gelatinized or cooked cereal upon further mixing forms a cooked farinaceous dough. A variety of well known cooking methods and equipment can be used to prepare a cooked cereal dough.

For example, the wetted cereal blend can be processed in a short cook time cooker extruder (e.g., a single or twin screw extruder) or in an extended cook time cooker such as a pressurized and agitated steam cooker each of which form the cooked cereal dough which in turn can be fed to a cereal pellet forming extruder to form cereal pellets. In another variation, the cooking and dough forming steps are performed simultaneously in a high pressure, cooker extruder equipped with a pellet-forming diehead. The cooked cereal dough pellets so formed typically range from about 18% to 30% moisture.

In another variation, the cooked cereal dough is formed into a dough sheet, which sheet is then sectioned, e.g., longitudinally cutting and transversely sheeting to form pellets in sheet form. The pellets can then be dried in a conventional pellet dryer and optionally tempered such as in a temper bin to adjust or equilibrate the moisture content for further processing.

In another variation, cooked whole cereal grains are tempered and thereafter are shredded in shredding rolls to form wet cereal shreds. In a further variation the shreds can be laminated or otherwise arranged or formed into biscuits of various sizes to form the cereal base. In another variation, the shredded cereal is formed into layers to form a shredded cereal biscuit. In even more particular shredded cereal embodiments, the shredded biscuits are filled such as with a fruit filling or a confection (e.g., a water based icing composition).

In other embodiments the cereal base may be a puffed cereal. Pellets having a moisture content of about 10% to 14% can be puffed such as by a conventional puffing gun to form a puffed R-T-E cereal base, especially oat based pieces in the form of rings or other compositions in the form of spherical puffed cereal pieces. The puffed base cereal pieces exit the puffing gun at a moisture content of about 6%. In the conventional technique for the production of presweetened as well as flavored or bit coated, the puffed pieces are charged directly to an enrober at their exiting 6% moisture content and are then tumbled and dried and thus coated with the topical coating materials. As part of the coating operation, the moisture content is reduced to the required 3% levels. In still other variations, the puffed pieces are prepared without an intermediate pellet forming step by direct expansion at the diehead of a cooker extruder, e.g., a twin screw cooker extruder.

In accordance with the present invention, phytoglycogen can be admixed with product as a powder or applied as a solution by means of water, milk, or other suitable edible solvents. We have observed that crust hardness tends to increase during flying when phytoglycogen is added to the product as a powder.

The invention will now be illustrated by means of the following examples, which are intended to exemplify but not to limit the invention.

EXAMPLE 1

Phytoglycogen was extracted from fresh milled corn grains, following a technique reported by Curá and Krisman (1990), supra, with minor modifications. Two volumes of distilled water were added to each volume of ground kernels and the suspension filtered with a cheese cloth. The filtered solution was centrifuged at 5000–6000 rpm during 20 minutes. The pellet was discarded and the supernatant was filtered with a cheese cloth. After centrifugation, the supernatant was mixed with three volumes of 96% ethanol. The suspension was centrifuged after keeping overnight at 4° C. The pellet obtained after centrifuging (water soluble polysaccharide) was dried using liquid nitrogen and kept in a chamber to complete drying. The powdered product obtained was identified as phytoglycogen using a spectrophotomer (Beckman DU7500) in presence of Krisman's reagent (Krisman, 1962), obtaining a maximum absorbence peak at 460 nm.

EXAMPLE 2

The extracted phytoglycogen powder of Example 1 was then mixed in water and applied to an illustrative food substrate prior to further processing (frying) using the following procedure.

A patty-shaped food substrate, prepared with corn starch and distilled water (1 g starch/3 ml water), was used in the experiments. Starch and water suspensions were mixed in a beaker placed in a hot water bath, using a hand mixer (Betty Crocker U.S.), equipped with spiral mixers at a speed number 1 of 5. After thickening, speed was increased to number 2 for 1 minute. The gelatinized sample was placed in a Teflon® mold (8.35 cm diameter and 2.54 cm thickness) and placed in the refrigerator for approximately 1 hour before frying.

Phytoglycogen was mixed in water at two different concentrations (1 g/10 ml, inventive embodiment 1, and 2 g/10 ml, inventive embodiment 2), and each different concentration was then coated twice, with a brush, over two main faces of different patty slabs. Control slabs and coated slabs were kept in a refrigerator at 4° C. prior to frying. The slabs (uncoated, coated with 1 g/10 ml phytoglycogen or 2 g/10 ml phytoglycogen) were fried in canola oil for 10 minutes at 180° C. fat temperature. A puncture test, performed by Texture Analyzer™, was used to determine the hardness of the crust for slabs with the two different coating concentrations and without coating after frying. A 2 mm puncture probe was used, with a test speed of 10 mm/s. Puncture force was determined for samples at 0, 0.5, and 1 hour of post-frying storage as grams. Experiments were conducted in triplicate.

TABLE 1

| | PUNCTURE FORCE | | |
| --- | --- | --- | --- |
| | TIME AFTER FRYING (minutes) | | |
| | 7 minutes | 40 minutes | 68 minutes |
| Control (uncoated) | 474.6 g | 280.1 g | 224.3 g |
| Inventive Embodiment 1 | 465.8 g | 468.3 g | 325.8 g |
| Inventive Embodiment 2 | 427.5 g | 557.5 g | 335.2 g |

As shown in Table 1, the patties coated with a mix of phytoglycogen and water (at both concentrations) had a rate of decreased hardness that was much smaller during the first 40 minutes of post-frying storage when compared with control samples (with no coating). The values in the table shown by Table 1 are averages of several measurements and the data scatter between measurement was somewhat high due to the complexity of product structure. However, there was no significant difference between the first two values for Embodiment 2 and only at the 68 minutes time after frying was there a noticeable decrease. The time after frying were averages for times when measurements were taken.

Foods contemplated for such inventively coated embodiments include, for example, french fries. These fried or grilled "fast foods" pose texture problems if prepared in advance of demand. This creates problems where peak customer times may make it difficult to meet customer demands of fast food turn around time.

Returning to Table 1, prior to frying, there was no difference in the hardness of the crust region between coated and uncoated samples. Increasing the concentration of the phytoglycogen in water mix led to an increase in the hardness in coated samples. One would wish empirically to determine, by routine experimentation, an optimum concentration of phytoglycogen to apply to the particular food, depending upon the processing and the amount of desired hardness. Still with reference to the Table 1 data, it was also observed that the presence of the inventive coatings improved the appearance and flavor of the fried product.

Foods treated in accordance with the invention retain their crispness for a significantly longer duration than samples without any inventive coating. Thus, the phytoglycogen was effective to increase resistance to wetting of the breakfast cereals by the liquid with which the food was expected to be exposed. Also, phytoglycogen was effective to increase resistance to wetting of the crust by the moisture transferred from the core during the post-frying period.

EXAMPLE 3

In experiments with Ready-to-Eat cereals, cereal flakes (KELLOGG'S CORN FLAKES) were coated with phytoglycogen (2 g/10 ml of water). The coated flakes were placed in an oven and heated at 150° for 30 minutes to evaporate the moisture in the coating and are represented in the data of the Table 2 as "inventive embodiment 3." The mechanical strength of the coated flakes were compared with that of un-coated flakes (control). Table 2 shows the high puncture force required for inventive, coated products even after 3.5 minutes of exposure in milk.

TABLE 2

| | PUNCTURE FORCE | | | | |
| --- | --- | --- | --- | --- | --- |
| | TIME IN MILK (minutes) | | | | |
| | 0 | .5 | 1.5 | 2.5 | 3.5 |
| Control (not coated) | 209.5 g | 128.5 g | 47.9 g | 39.5 g | 10.3 g |
| Inventive Embodiment 3 | 449.8 g | 377.3 g | 376.8 g | 379.9 g | 370.7 g |

As seen in Table 2, the puncture force for inventive, coated flakes was about 20–30 times greater than that of uncoated flakes over a period of about 3.5 minutes milk exposure. Higher puncture force signifies greater hardness and a perceived greater crispness.

EXAMPLE 4

Several different brands of cereals from Kellogg company were used for this test: COMPLETE, KELLOGG'S HONEY CRUNCH CORN FLAKES, KELLOGG'S CORN FLAKES, MINI-WHEATS, and RICE KRISPIES. The main components of these products are described in Table 3.

TABLE 3

| BRAND NAME OF CEREAL | COMPONENTS |
| --- | --- |
| COMPLETE | Whole wheat, wheat bran, sugar, high fructose corn syrup, salt, malt flavoring |
| KELLOGG'S CORN FLAKES | milled corn, sugar, salt, malt flavoring, high fructose corn syrup |
| KELLOGG'S HONEY CRUNCH CORN FLAKES | Milled corn, sugar, almonds, honey, salt, high fructose corn syrup, malt flavoring |
| MINI-WHEATS | Whole grain wheat, sugar, sorbitol, gelatin |
| RICE KRISPIES | Rice, sugar, salt, high fructose corn syrup, malt flavoring |

A puncture test was performed on the flake-shaped cereals using a Texture Analyzer TA-XT2 (Texture Technology Corp.) with a 2 mm-diameter puncture test probe. Ten samples of each cereal were selected for each experiment. Samples were placed in milk (at room temperature) and afterwards each flake was withdrawn and tested at different times, determined using a stopwatch. In this way, the initial force (without milk) and the puncture force of the cereal for different times in milk were determined. Each experiment was performed at least by triplicate.

The hardness (determined by using puncture test) of the different kinds of cereals were determined as a function of time in milk. Samples of COMPLETE, KELLOGG'S HONEY CRUNCH CORN FLAKES, and KELLOGG'S CORN FLAKES cereals all showed a relatively low initial puncture force. No further result could be obtained after four to five minutes in milk using the puncture probe because of very low readings of force.

Three parameters, peak force of the dry cereal, peak force of the wet cereal (peak force of the same cereals for different times in milk) and percentage of texture retention, are commonly used for differentiating commercial R-T-E cereal products. The percentage of texture retention was calculated as the ratio of the peak force of the samples immersed in milk over the peak force of dry product, multiplied by 100 for the different cereals studied.

Initial hardnesses (before milk exposure) were on the order of about 200 g for the COMPLETE, KELLOGG'S HONEY CRUNCH CORN FLAKES, and KELLOGG'S CORN FLAKES cereals (the differently sized and shaped MINI-WHEATS and RICE KRISPIES cereals were tested as described in Example 5). By one-half minute time in milk, the three cereals had lost from about 25% hardness (KELLOGG'S HONEY CRUNCH CORN FLAKES cereal) to about half of their hardness (COMPLETE and KELLOGG'S CORN FLAKES cereals). By two minutes time in milk, the KELLOGG'S HONEY CRUNCH CORN FLAKES cereal had about 60% texture retention, whereas the KELLOGG'S CORN FLAKES cereal had only about 40% texture retention and the COMPLETE cereal had just about 25% texture retention.

EXAMPLE 5

Other tests were conducted using the Kramer Shear probe with five blades. Fifteen grams of samples were weighed for each experiment. This test was performed for different times in milk (0, 2, 3, and 5 minutes) at 8° C. The tests were performed by triplicate. Edible coatings in accordance with the invention were also tested in a manner determining whether bowl life of the (control) R-T-E cereals was increased. The coatings were prepared as a solution of the powdered component obtained from corn and distilled water (1 g powder/10 ml distilled water), as described by Example 1. The edible coatings were sprayed on both sides of the samples and dried up for ten minutes using an over at 110° C. Samples were allowed to reach room temperature before each test. Three replications for each time were made to get more accurate results.

The peak force measured in each test was considered as the hardness of the sample. The percent of texture retention of the different cereals were calculated. Inventive Embodiment 4 was the inventive coated KELLOGG'S CORN FLAKES cereal which showed noticeably improved texture retention in milk. The inventively coated KELLOGG'S HONEY CRUNCH CORN FLAKES (Inventive Embodiment 5), COMPLETE (Inventive Embodiment 6), and RICE KRISPIES (Inventive Embodiment 7) cereals showed a similar behavior, but the improvement was less than with the inventively coated KELLOGG'S CORN FLAKES cereal. The controls were simply the respective commercially available cereals.

TABLE 4

| Tested Cereals | % Texture Retention After Time In Milk | | |
|---|---|---|---|
| | 2 minutes | 3 minutes | 5 minutes |
| Control 4 | 32.5 | 25.8 | 27.5 |
| Inventive Embodiment 4 | 88.5 | 86.3 | 77.1 |
| Control 5 | 37.8 | 29.6 | 30.2 |
| Inventive Embodiment 5 | 100.9 | 108.5 | 101.1 |
| Control 6 | 25.3 | 20.1 | 8.0 |
| Inventive Embodiment 6 | 33.9 | 33.8 | 21.5 |
| Control 7 | 15.5 | 13.0 | 13.2 |
| Inventive Embodiment 7 | 94.8 | 95.1 | 66.2 |

It is to be understood that while the invention has been described above in conjunction with preferred specific embodiments, the description and examples are intended to illustrate and not limit the scope of the invention, which is defined by the scope of the appended claims.

It is claimed:

1. A food having a coating thereon, wherein said coating includes a phytoglycogen, derived from sweet corn and comprising glucose molecules linked by $\alpha$-D-(1→4) bonds with $\alpha$-D-(1→6) branch points, in an amount effective to increase resistance to wetting of said food by a liquid to which the food is exposed.

2. The food as in claim 1 wherein the food is a ready-to-eat cereal.

3. The food as in claim 1 wherein the food is french fries.

4. The food as in claim 1 wherein the liquid with which the food is exposed includes an oil.

5. The food as in claim 1 wherein the liquid with which the food is exposed is an aqueous solution.

6. The food as in claim 1 wherein the liquid with which the food is exposed is milk.

7. A food having a moisture retarding coating thereon, comprising:

phytoglycogen adhered to a surface of the food as a layer thereon and being in an amount effective to increase hardness of the surface, wherein said phytoglycogen is derived from sweet corn and comprises glucose molecules linked by $\alpha$-D-(1→4) bonds with $\alpha$-D-(1→6) branch points.

8. A method of preparing a ready-to-eat cereal having an extended bowl life; comprising:

applying a solution of phytoglycogen to surfaces of the ready-to-eat cereal, wherein said phytoglycogen is derived from sweet corn and comprises glucose molecules linked by $\alpha$-D-(1→4) bonds with $\alpha$-D-(1→6) branch points.

9. The method as in claim 8 wherein the phytoglycogen is derived by being extracted from corn and consists essentially of glucose molecules linked by $\alpha$-D-(1→4) bonds with $\alpha$-D-(1→6) branch points.

10. A method of increasing the resistance of a food to wetting by a liquid to which the food is exposed, comprising applying on the outer surfaces of said food a coating comprising a phytoglycogen derived from sweet corn and comprising glucose molecules linked by $\alpha$-D-(1→4) bonds with $\alpha$-D-(1→6) branch points.

11. The method of claim 10 wherein said food is a cereal.

12. The method of claim 11 wherein said liquid is milk.

13. The method of claim 10 wherein said food is french fries.

14. The method of claim 13 wherein said liquid is oil.

15. A method of increasing the bowl life of a cereal comprising applying on the outer surfaces of a cereal a coating comprising a phytoglycogen derived from sweet corn and comprising glucose molecules linked by $\alpha$-D-(1→4) bonds with $\alpha$-D-(1→6) branch points.

* * * * *